April 27, 1954 W. S. BACHMAN 2,676,806

PHONOGRAPH REPRODUCER ARM ASSEMBLY

Filed May 29, 1948

INVENTOR
WILLIAM S. BACHMAN
BY
Pennie, Edmonds, Morton & Barrows
ATTORNEYS

Patented Apr. 27, 1954

2,676,806

UNITED STATES PATENT OFFICE 2,676,806

PHONOGRAPH REPRODUCER ARM ASSEMBLY

William S. Bachman, Southport, Conn., assignor to Columbia Broadcasting System, Inc., New York, N. Y., a corporation of New York Application May 29, 1948, Serial No. 29,997

19 Claims. (Cl. 274—23)

This invention relates to phonograph reproducer arms, and particularly to the reduction or elimination of low-frequency resonant oscillations therein.

Phonograph reproducer or pickup arm assemblies commonly have an arm of desired length which is coupled to a fixed support for movement in both lateral and vertical directions. A stylus is mounted at the end of the arm remote from the support for engagement with a record surface. The usual stylus mounting is a suspension which provides lateral compliance, and recently designed mountings also provide vertical compliance. In the case of lateral cut records the lateral compliance allows the stylus to follow the lateral variations in the modulated groove but provides a restoring force which tends to maintain the stylus in mid-position. Vertical compliance is often provided to decrease needle talk and to allow the stylus to follow uneven surfaces without difficulty. Commonly the coupling between arm and fixed support is made as frictionless as possible so as not to impair the movement of the arm and stylus. Free lateral movement permits the stylus to follow the record groove spiral without difficulty, and free vertical movement allows the stylus to follow warped records, etc.

Adopting the terminology of mechanical-electrical analogies, the compliance of the stylus suspension provides a mechanical reactance which is analogous to the reactance of a capacitor in an electrical circuit. Similarly, the dynamic mass of the arm and cartridge assembly provides a mechanical reactance of opposite sign, analogous to inductive reactance in an electrical circuit. At the frequency where the compliance and the dynamic mass have equal mechanical reactances of opposite sign, a resonance occurs. Such a resonance affects both the electrical output of the pickup cartridge (crystal, electromagnetic, etc.) and the mechanical stability of the arm in tracking.

The electrical effect due to resonance produces a sharp peak in the output of the pickup cartridge at the resonant frequency. This is undesirable since it destroys the linearity of response. The mechanical instability of tracking renders the reproducer assembly vulnerable to vibration and sudden shocks. The pickup arm is thus likely to jump grooves even with relatively slight jars.

In the past it has been common to choose the effective mass of the arm and the compliance of the stylus suspension so that the resonant frequency occurs below the useful frequency range to be reproduced. While this produces uniform electrical output within the useful frequency range, there is still considerable mechanical instability which makes the turntable assembly very critical with respect to mechanical shock and vibration.

Various attempts have been made to damp out the low-frequency resonant oscillations. Damping has commonly been provided in the pickup cartridge located at the end of the arm, and particularly in the pivot about which the stylus assembly oscillates. The amount of damping which can be provided in the pivot of the stylus assembly is limited by the necessity of allowing the stylus to follow accurately the modulation of the groove without excessive needle pressure. The present tendency is to reduce needle pressure to a minimum so as to reduce record wear and noise. For example, needle pressures of 15 grams and less have been employed with success. Thus the damping which can be provided at the pivot of the stylus assembly is too small to be very effective in damping the low-frequency resonance of the arm. Further damping may be provided between the stylus assembly and the point at which the pickup cartridge is rigidly attached to the arm, but this imposes rather severe limitations on the design of the cartridge.

Generally speaking, in the usual pickup arm, the arm is mass-controlled above the resonant frequency, since the mechanical reactance of the mass is greater than that of the compliance. Below the resonant frequency, the arm is said to be stiffness-controlled, since the reactance of the compliance is greater than that of the arm mass.

Broadly, in accordance with the present invention, mechanical resistance is provided at the coupling between the arm and the mounting support, so as to provide substantial damping of the low-frequency oscillations. It is found that sufficient damping can be provided at this point to substantially damp out the low-frequency resonance without seriously impairing the proper tracking of the stylus, and without substantially increasing the required needle-point pressure.

Damping is accomplished by introducing mechanical resistance in the coupling between arm and support to provide mechanical resistance to movement of the arm in at least one direction. Mechanical resistance to movement only in the lateral direction, for laterally-cut records, will reduce resonant oscillations in that direction and hence improve tracking stability at low frequencies and also reduce the peak in the response curve at the resonant frequency. In addition, it will render the pickup arm less susceptible to jumping grooves when the player is jarred or subjected to vibration. Damping of arm movements in the vertical direction only is of material assistance in securing proper tracking, particularly under conditions of sudden shock or vibration, and reduces the danger of damaging a record or stylus by accidental dropping of the pickup arm. Due to the V-shape of the record grooves, any lateral movement of the stylus produces a vertical as well as a lateral force on the pickup, so that vertical resonance may be excited by lateral stimulation. Hence damping in one direction only will have beneficial effects in the other direction also. It is preferred, however, to provide mechanical resistance effective in both lateral and vertical directions and specific embodiments are described hereinafter which give such damping.

Various damping means may be employed to introduce mechanical resistance at the coupling. In general it is advantageous to employ means approximating pure mechanical resistance. That is, the ratio of mechanical resistance to restoring force should be high. Viscous materials exhibiting a high ratio of mechanical resistance to restoring force may be employed to advantage. Such materials appear to have a sort of internal friction which gives them their mechanical resistance properties. In particular, lubricants of high viscosity have been found highly satisfactory and are used in the specific embodiments hereinafter described. Electromagnetic damping means, such as eddy current damping, provides substantially pure mechanical resistance and, although more expensive and difficult to use, may be employed if desired.

The amount of damping resistance may be selected within limits in accordance with the specific application to which the invention is applied. An amount of mechanical resistance which will critically damp the low-frequency resonance of the arm is usually optimum. Such critical damping renders the pickup arm very stable in tracking at all frequencies and does not materially increase the needle point pressure required for proper tracking over that necessary under non-resonant conditions. The tracking is also highly stable even under relatively severe conditions of shock and vibration. In addition, the rise in the response characteristic at the resonant frequency is reduced to a negligible amount, hence giving a very smooth frequency response. Values of damping resistance greater than that required for critical damping can be employed, but are in general unnecessary.

In some cases it may be difficult to introduce sufficient mechanical resistance to critically damp the arm, or it may be desired to retain a certain amount of increased response at and near the resonant frequency. Reducing the resistance to one-third that required for critical damping increases the needle point pressure required for tracking under resonant conditions approximately 60% and somewhat increases the response at resonance. Such performance is ordinarily satisfactory and the increase in response at resonance may sometimes be helpful. Reducing the resistance to approximately one-sixth that required for critical damping increases the weight required for proper tracking approximately three times and still further increases the response at resonance. Such operation is often adequate, although it is preferred to use resistance more closely approaching that required for critical damping.

The invention will be more fully understood by reference to the following description of specific embodiments, taken in conjunction with the accompanying drawings in which.

Figures 1, 2, 3, 4, 5:
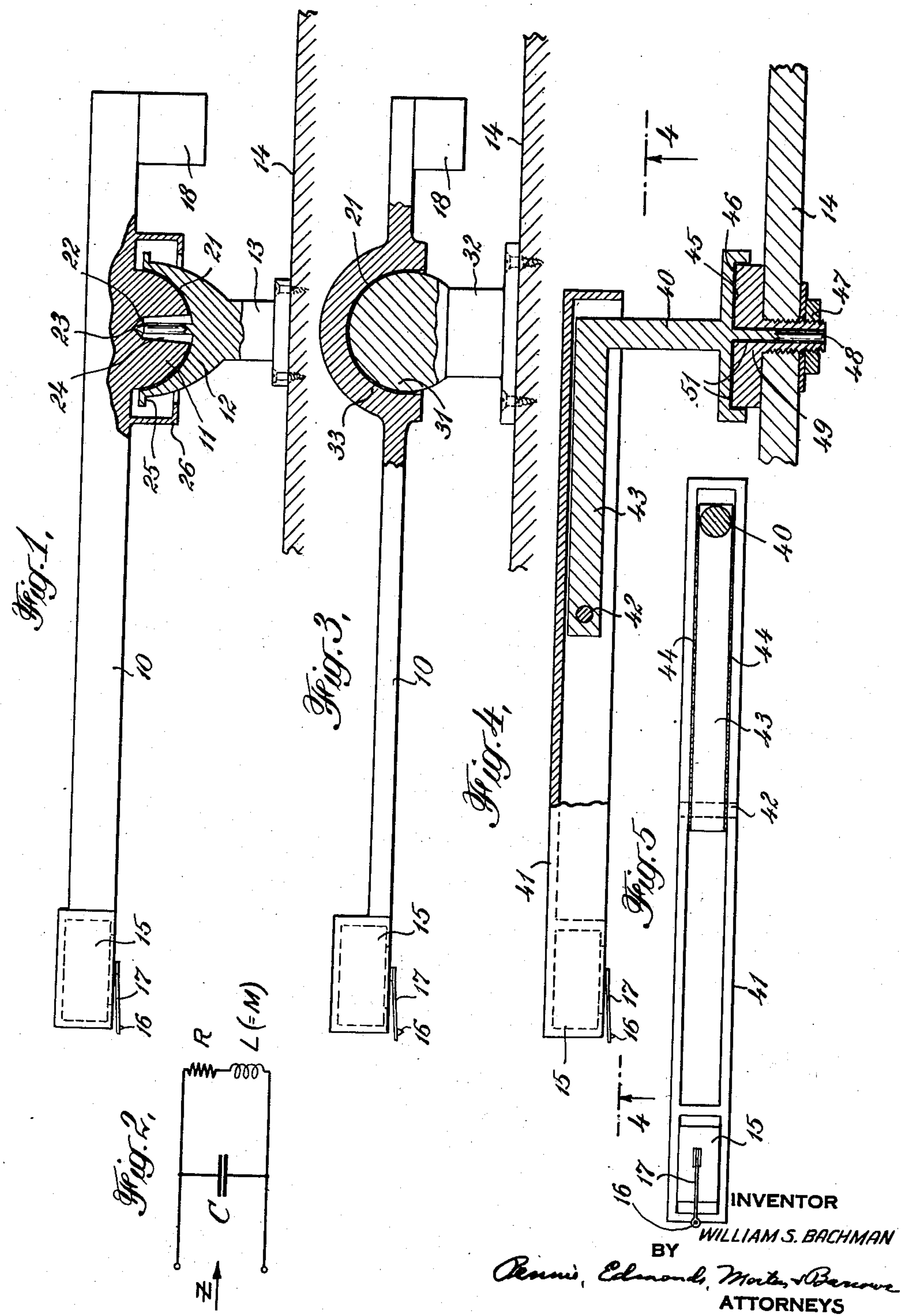
Fig. 1 illustrates a reproducer arm, partially in section, employing a ball-and-socket coupling joint.
Fig. 2 is the electrical analogue of the arm of Fig. 1 at low frequencies.
Fig. 3 is another embodiment, partially in section, employing a ball-and-socket coupling joint.
Fig. 4 is a side view, partially in section, of a further embodiment of the invention employing flat plates instead of spherical surfaces.
Fig. 5 is a bottom view, partially in section, of the arm of Fig. 4, taken along the line 4—4.

Referring now to Fig. 1, a rigid arm 10 is provided with a ball-and-socket joint 11, 12 which couples the arm to mounting support 13 in the form of a pedestal. Pedestal 13 may be mounted on support plate 14 in any suitable manner. At the end of arm 10 remote from the support 13, a pickup cartridge 15 is attached. Cartridge 15 has a stylus 16 mounted at the end of a cantilever suspension 17 which allows lateral and vertical compliance between stylus 16 and the cartridge 15 which is fixed in arm 10. At the opposite end of the arm a counterweight 18 may be provided, if necessary, in order to obtain the desired stylus pressure on a record surface. The arm is mounted on plate 14 at a suitable height to permit stylus 16 to engage the sound grooves of a record disk properly.

Between the cooperating surfaces of ball 11 and socket 12 is a film 21 of a viscous lubricant. This provides mechanical resistance to movement of the pickup arm in any direction. In order to maintain a constant clearance between the cooperating spherical surfaces of the joint, a pivot pin 22 is formed in socket 12 and engages arm 10 at a bearing point 23 which is concentric with ball 11. Bearing point 23 is also concentric with the center of the spherical surface of socket 12, and hence a clearance 21 is maintained at all times which is equal to the difference between the radii of the ball and socket surfaces. The hole or socket 24 in ball 11 is made sufficiently large to allow the desired range of movement of the pickup arm in the vertical direction. The center of gravity of the arm is located so that the arm maintains its upright position.

In order to avoid danger of completely separating the pickup arm 10 from support 13 during use, a circular flange 25 may be provided on the upper end of support 13, and a retaining ring 26 attached to arm 10 in any desired manner. The vertical clearance between the retaining ring and flange is made sufficiently large to allow the desired range of movement of stylus 16.

In the absence of any lubricant, the friction of the ball-and-socket joint is very small due to the pivot-bearing arrangement. The effect of the viscous lubricant is to provide mechanical resistance to movement of the arm 10 in any direction. Assuming stylus 16 to be in engagement with a laterally-modulated sound record groove, the stylus is oscillated laterally at a frequency determined by the sound being reproduced. The compliance provided by cantilever 17 allows lateral movement of stylus 16 and also couples part of this movement to suitable means in cartridge 15 for developing an electric signal wave from the mechanical movement. Additional compliance may, of course, be present in the cartridge itself.

Arm 10, including cartridge 15 and counterweight 18, of course has mass. The dynamic mass of the arm as a whole produces a mechanical reactance which is opposite in sign to the mechanical reactance of the compliance between stylus 16 and the arm. As a result, a resonant circuit is established which tends to oscillate at a resonate frequency. The mass of the arm and the compliance are commonly selected so that resonance occurs at a relatively low frequency. In some cases the resonant frequency may be sufficiently low to be outside the range of frequencies to be reproduced, and hence the resonance of the arm will not affect the linearity of the response curve. In other cases, the resonant frequency may be within the useful range of frequencies and a very marked increase in output will result.

While a certain amount of resonance may be tolerated, and indeed may in some cases be desirable to compensate for other deficiencies in the reproducing system, an undamped resonant peak is undesirable. If the arm resonant frequency is within the frequency band recorded in the record, tracking instability may be present for frequencies near resonance and the pickup arm may actually jump grooves for sounds at or near the resonant frequency of the arm. Furthermore, whether the resonant frequency lies within the frequency band being reproduced or not, tracking instability under conditions of shock and vibration are still present.

The mechanical resistance provided by the viscous lubricant 21 in the ball-and-socket joint serves to provide damping of the low-frequency arm resonance. If sufficient mechanical resistance is provided the arm may be critically damped, in which case excellent stability will be obtained throughout the frequency range of reproduction and despite mechanical shock or vibration. Furthermore, the output response of cartridge 15 will be affected only negligibly by the arm resonance, thus yielding a smooth characteristic commonly to be desired.

The mechanical resistance required for critical damping may readily be calculated when the dynamic mass and compliance of the arm are known. Fig. 2 represents a circuit which is the electrical analogue of the pickup arm of Fig. 1 at low frequenies. The electrical terms and their mechanical analogies are as follows:

$Z$=impedance=needle point impedance
$C$=capacitance=compliance
$L$=inductance=mass
$R$=resistance=mechanical resistance From well-known electric circuit analysis, the critical damping resistance $R_c$ is:

$$R_c=\sqrt{\frac{4L}{C}} \qquad (1)$$

A specific example will aid in understanding the practical application of the invention. Assuming that the pickup arm has an effective lateral dynamic mass at the stylus tip of 10 grams, and that the lateral compliance between the stylus tip and the arm is $10^{-6}$ centimeters per dyne, the resonant frequency $f_r$ is conventionally calculated from the following formula:

$$f_r=\frac{1}{2\pi}\sqrt{\frac{1}{LC}} \qquad (2)$$

With the above specific values, the resonant frequency is 50.3 cycles per second. From Equation 1 the resistance $R_c$ required to critically damp this arm resonance is 6300 mechanical ohms (dyne-seconds per centimeter).

The added force at the stylus tip required to move the arm laterally against this resistance may also be conveniently calculated from the following formula:

$$\text{Force}=R\times\text{Velocity} \qquad (3)$$

Here the force is the lateral force at the stylus tip, R is the effective mechanical resistance at the stylus tip, and the velocity is the radial velocity of the stylus tip in tracking the spiral record groove.

A pickup arm with the above constants has been successfully employed with a record having 224 grooves per inch and rotating at 33⅓ R. P. M. With these record constants, the radial velocity of the stylus is approximately 0.0063 centimeter per second. From Equation 3 the force is calculated at approximately 0.04 gram. Assuming that the walls of the groove are at 45° to the horizontal, which is approximately that employed in standard records, the added weight required for proper tracking is 0.04 gram. This increase in needle point pressure is negligible since several grams are necessary to enable the stylus to follow the groove modulation.

The effect of the mechanical resistance on the needle point impedance Z is important since the needle point impedance determines the weight required at the needle to enable it to properly track the modulations of the sound groove. The lateral force on the stylus in tracking a laterally-modulated groove is:

$$\text{Force}=Z\times v \qquad (4)$$

where $v$ is the lateral velocity of the stylus produced by the lateral undulations of the sound groove. The magnitude of Z may be obtained by finding the impedance of the circuit of Fig. 2, for which the following equation applies:

$$Z=\sqrt{\frac{R^2+\omega^2L^2}{(1-\omega^2LC)^2+\omega^2C^2R^2}} \qquad (5)$$

In practice it is found that if the tracking at the resonant frequency is satisfactory, it will be satisfactory over the remainder of the frequency range to be reproduced. At the resonant frequency, Equation 5 reduces to the following form:

$$Z_R=\sqrt{\frac{R^2+\omega^2L^2}{\omega^2C^2R^2}} \qquad (6)$$

Theoretically if there were no damping whatever, the needle point impedance at the resonant frequency would be infinite, and the weight of the pickup head would need to be infinite for proper tracking. Actually, there is always some damping present so that it is common practice to simply make the weight at the needle point sufficiently high to ensure that the needle stays in the groove. However, as will be pointed out hereinafter, even though the stylus stays in the groove, large peaks in the response characteristic are produced at the resonant frequency if the arm is relatively undamped.

As a reference point, a so-called "non-resonant impedance" at the resonant frequency is sometimes calculated. This impedance is that of either the compliance or the mass at the resonant frequency, these being, of course, equal in magnitude. With the above constants this impedance, denoted $Z_0$, is readily calculated as 3160 mechanical ohms. To determine the needle point pressure required to track properly for such a needle point impedance, a maximum velocity of 0.74 centimeter per second may be assumed. This has actually been employed in practice with success and is approximately the maximum velocity imparted to the stylus by a 50-cycle modulation and 0.001 inch displacement. With the aid of Equation 4 the weight is calculated as 2.38 grams.

With critical damping, Equation 6 gives a needle point impedance of 3540 mechanical ohms, and the corresponding weight is 2.67 grams. It will thus be seen that by critically damping the arm in accordance with the present invention, the weight required for proper tracking at the resonant frequency approaches very closely that required under non-resonant conditions. Normally the weight of the arm at the stylus will be somewhat greater than that actually necessary from the above considerations, to provide a factor of safety. With the arm and record described above, six grams have been employed with success.

The variation in response may also be readily calculated from the following equation:

$$\text{Response}=\frac{B_c}{Y}=B_c\times Z \qquad (7)$$

where $B_c$ is the susceptance of the compliance path C, and Y is the admittance of the circuit of Fig. 2. With the above-assumed values it will be found at critical damping the response is within 1 db of that obtained under non-resonant conditions.

While the above discussion, and the calculations made of a specific example, demonstrates the excellent performance obtained when using critical damping in accordance with the invention, the value of the damping resistance may be changed considerably and still obtain highly advantageous results. If the value of the damping resistance is increased over that necessary to provide critcial damping, the rise in the response characteristic at the resonant frequency is even less, and the weight required for proper tracking of the sound groove modulations approaches more closely to that required under non-resonant conditions. However, the force required to move the stylus radially inwards to follow the sound groove spiral is increased.

The resistance may also be reduced considerably below that required for critical damping while retaining advantageous operation. It is considered desirable to provide an amount of resistance greater than one-third the critical damping resistance. Within this range, the weight required for proper tracking of the groove modulations exceeds the weight required with critical damping by not more than about 60%, and the rise in the response at resonant frequency is moderate. Values of resistance down to one-sixth that required for critical damping also yield advantageous results. The weight required for proper tracking of the groove modulations is within three times that required with critical damping, and the increase in response at resonance is greater.

The determination of the dimensions and clearance of the ball-and-socket joint is subject to calculation but, due to lack of precise knowledge of the physical properties of highly viscous lubricants, a partly empirical approach is considered to be simpler and less time consuming. The resistance at the ball-and-socket joint required to produce a given resistance effective at the stylus will, of course, depend upon the length of the arm between stylus and joint, surface area of the joint, the effective radius at which the viscous lubricant acts, the viscosity of the lubricant itself, etc. Data on the mechanical resistance obtained with various viscous lubricants under different conditions are not readily available at the present time. By applying a selected viscous lubricant to a cylindrical rod inside a vertical cylindrical hole, the mechanical resistance may be determined from the rate of fall of the rod in the hole. As a rough approximation, mechanical resistance may be assumed to vary directly with the area and inversely with the clearance. From data obtained in this fashion, the approximate size and clearance of the ball-and-socket joint may be determined. It should be kept in mind, of course, that the effective radius of the viscous lubricant which resists movement of the arm in a lateral direction varies from a maximum at the top of the socket 12 of Fig. 1 to a minimum at the bottom thereof. This factor must of course be taken into account in making calculations.

If desired, the damping resistance required in the vertical direction may be calculated from the vertical compliance and vertical dynamic mass of the arm, and the ball-and-socket joint proportioned to provide the required mechanical resistance.

When the arm has been constructed, the mechanical resistance in the vertical direction may be determined by timing the rate of fall of the arm. The mechanical resistance in the lateral direction may be determined by attaching a string to the stylus point, running it horizontally over a pulley, and attaching a weight to the free end of the string. For small arcs this permits direct calculation of the mechanical resistance. If the value is not within the desired range, appropriate changes may be made in the size and clearance of the ball-and-socket joint or in the viscous lubricant employed.

As an aid in the ready practice of the invention, relatively short arms, approximately 6½ inches in length for use with 12-inch records, with the values of mass and compliance given hereinbefore have been made with a ¾ inch diameter ball-and-socket joint and 0.002 inch clearance. Longer arms for use with 16-inch records have been made with a 1½ inch diameter ball-and-socket joint and 0.004 inch clearance.

The viscous lubricant may be selected as desired. Heavy petroleum oils and silicone oils have been employed with success. Silicone oils appear to be particularly desirable in that their viscosity varies less with temperature changes. Lubricants with viscosities from 2000 centistokes upwards have been employed with success. A silicone lubricant having a viscosity of about 100,000 centistokes has been used often. It is found that in general the mechanical resistance does not appear to increase in direct proportion to the increase in viscosity. The lower viscosity lubricants within the range given above tend to be more nearly pure mechanical resistances. Lubricants having very high viscosities tend to exhibit a certain amount of restoring force. Nevertheless, sufficient mechanical resistance may readily be obtained to give highly satisfactory operation.

It will be understood that since the ball-and-socket joint of Fig. 1 is only half a sphere, the viscous lubricant provides greater mechanical resistance in the lateral direction than in the vertical direction. This has been found satisfactory in practice but, if desired, the resistance in the two directions could be equalized by employing full spherical ball-and-socket joints.

An additional advantage resulting from the use of mechanical resistance in the vertical direction is that if the arm is raised off a record surface and released, accidentally or otherwise, it will drop slowly onto the record without danger of injuring either the stylus or the record. The use of the pivot pin 22 also eliminates the need for accurately leveling the mounting plate 14, inasmuch as the pivot point serves in both horizontal and vertical planes.

Fig. 3 shows another version of the pickup arm in which the ball 31 is part of the mounting support 32, and the socket portion 33 of the joint is part of pickup arm 10. The viscous lubricant 21 is between the two cooperating surfaces as described above. The construction shown in Fig. 1 is presently preferred to that shown in Fig. 3 because in the latter arm the weight of the arm may force some of the viscous lubricant out of the joint, and the viscous lubricant itself may tend to flow out. If desired, a pivot could be formed integrally with the socket and extend downwards to engage a bearing point formed at the center of the ball 31. This would result in maintaining a constant clearance in the same manner as shown in the arm of Fig. 1.

The determination of the required amount of mechanical resistance for the arm of Fig. 3 is subject to the same considerations explained hereinbefore in connection with Figs. 1 and 2.

Referring now to Figs. 4 and 5, a pivotal coupling is provided in which separate pivots are employed for lateral and vertical movement. Arm 41 has a pickup cartridge 15 at one end thereof with a stylus 16 attached to the cartridge by the cantilever suspension 17. The arm is pivoted at 42 to an L-shaped member comprising a horizontal portion 43 with flat vertical sides, and a vertical portion 40. Pivot 42 is located at one end of the horizontal leg 43, and extends horizontally to allow vertical movement of the arm. As shown in Fig. 5, a viscous lubricant 44 is applied between the vertical sides of leg 43 and cooperating interior walls of the arm 41. This provides mechanical resistance to movement of the arm in the vertical direction.

The lower portion of vertical leg 40 is enlarged to form a flat circular surface 45 which cooperates with the upper surface of mounting disc 46 which is attached to a supporting plate 14 by means of the thread and nut connection 47. The cylindrical bearing rod 48 is formed integrally with the vertical leg 40 and cooperates with bearing 49 to allow movement of the arm in the lateral direction.

A viscous lubricant 51 is inserted between the cooperating circular surfaces 45 and 46, and in the vertical portion of the bearing. This provides mechanical resistance to movement of the arm in the lateral direction.

The amount of mechanical resistance provided may be determined in accordance with the considerations given hereinbefore in connection with Fig. 1. Inasmuch as the vertical and lateral damping resistances are introduced at different points in the arm of Fig. 4, the amount of resistance in each direction may be determined in accordance with the compliance and dynamic mass of the arm in the corresponding directions. If desired, mechanical resistance could be provided in one direction only by employing ordinary non-viscous lubricant in the other direction.

The foregoing specific embodiments have been described particularly in connection with the use of viscous lubricants to provide mechanical damping. If desired, other forms of materials providing mechanical resistance could be applied in shunt with vertical and horizontal pivotal connections of an arm to obtain damping as above described. Also, electromagnetic or eddy current damping could be employed if desired.

The invention has been described in connection with several embodiments thereof, and a specific example has been given. It will be understood that many variations are possible within the spirit and scope of the invention as defined in the following claims.

I claim:

1. A phonograph reproducer arm assembly comprising an arm, a support for said arm, a coupling movably attaching said arm to said support having substantially horizontal and substantially vertical axes of rotation, one of said axes being substantially fixed with respect to said arm and the other substantially fixed with respect to said support, a pair of adjacent relatively movable surfaces with substantially constant clearance therebetween associated with said coupling for relative movement about at least one of said axes of rotation, a stylus mounting on said arm at a point remote from said support providing compliance between the stylus and the arm, and a viscous material between said surfaces to provide mechanical resistance to movement of said arm in at least one direction, one of said surfaces being substantially immovable in said one direction with respect to the arm and the other surface being substantially immovable in said one direction with respect to said support, said resistance being selected to substantially damp the resonance of said compliance with the mass of said arm.

2. A phonograph reproducer arm assembly comprising a reproducer arm, a support for said arm, a universal coupling attaching said arm to said support near one end thereof to allow vertical and horizontal movement of the arm about substantially horizontal and substantially vertical axes of rotation, one of said axes being substantially fixed with respect to said arm and the other substantially fixed with respect to said support, a pair of adjacent relatively movable surfaces with substantially constant clearance therebetween associated with said coupling for relative movement about at least one of said axes of rotation, a stylus mounting on said arm at a point remote from said support providing compliance between the stylus and the arm, and a yieldable viscous material between said surfaces to provide mechanical resistance to movement of said arm in at least one direction, one of said surfaces being substantially immovable in said one direction with respect to the arm and the other surface being substantially immovable in said one direction with respect to said support, the magnitude of said mechanical resistance being predetermined to provide substantial damping of low-frequency resonant oscillations of said compliance with the mass of said arm.

3. A phonograph reproducer arm assembly for reproducing sound from laterally modulated sound grooves which comprises a reproducer arm, a support for said arm, a coupling attaching said arm to said support for lateral and vertical movement of the arm about substantially horizontal and substantially vertical axes of rotation, one of said axes being substantially fixed with respect to said arm and the other substantially fixed with respect to said support, a pair of adjacent relatively movable surfaces with substantially constant clearance therebetween associated with said coupling for relative movement about at least one of said axes of rotation, a suspension for mounting a stylus on said arm at a point remote from said support with compliance between the stylus and the arm, and a yieldable viscous material between said surfaces to provide mechanical resistance to movement of said arm in at least one direction, one of said surfaces being substantially immovable in said one direction with respect to the arm and the other surface being substantially immovable in said one direction with respect to said support, the magnitude of said mechanical resistance being at least one-sixth that required to critically damp the low-frequency resonant oscillations of said compliance with the mass of said arm in said one direction.

4. A phonograph reproducer arm assembly comprising a rigid reproducer arm, a support for said arm, a coupling attaching said arm near one end thereof to said support for lateral and vertical movement of the arm about substantially horizontal and substantially vertical axes of rotation, one of said axes being substantially fixed with respect to said arm and the other substantially fixed with respect to said support, a pair of adjacent relatively movable surfaces with substantially constant clearance therebetween associated with said coupling for relative movement about at least one of said axes of rotation, a stylus mounting on said arm at a point remote from said support providing compliance between the stylus and the arm, and a yieldable viscous material between said surfaces to provide mechanical resistance to movement of said arm in at least one direction, one of said surfaces being substantially immovable in said one direction with respect to the arm and the other surface being substantially immovable in said one direction with respect to said support, the magnitude of said mechanical resistance being predetermined to substantially damp out low-frequency resonant oscillations of said compliance with the mass of said arm in said one direction, whereby tracking stability and response at the resonant frequency may be improved.

5. A phonograph reproducer arm assembly comprising an arm, a support for said arm, a coupling movably attaching said arm to said support having substantially horizontal and substantially vertical axes of rotation, one of said axes being substantially fixed with respect to said arm and the other substantially fixed with respect to said support, a pair of adjacent relatively movable surfaces with substantially constant clearance therebetween associated with said coupling for relative movement about at least one of said axes of rotation, a stylus mounting on said arm at a point remote from said support providing compliance between the stylus and the arm, and a viscous lubricant between said surfaces providing mechanical resistance to movement of said arm in at least one direction, one of said surfaces being substantially immovable in said one direction with respect to the arm and the other surface being substantially immovable in said one direction with respect to said support, said mechanical resistance effecting substantial damping of the resonance of said compliance with the mass of said arm.

6. A phonograph reproducer arm assembly comprising a reproducer arm, a support for said arm, a coupling movably attaching said arm to said support having substantially horizontal and substantially vertical axes of rotation, one of said axes being substantially fixed with respect to said arm and the other substantially fixed with respect to said support, a pair of adjacent relatively movable surfaces with substantially constant clearance therebetween associated with said coupling for relative movement about at least one of said axes of rotation, a stylus mounting on said arm at a point remote from said support providing compliance between the stylus and the arm, and a viscous lubricant between said surfaces providing mechanical resistance to movement of said arm in at least one direction, one of said surfaces being substantially immovable in said one direction with respect to the arm and the other surface being substantially immovable in said one direction with respect to said support, said mechanical resistance being at least one-sixth that required to critically damp the low-frequency resonance of said compliance with the mass of said arm.

7. A phonograph reproducer arm assembly comprising a substantially rigid arm, a support for said arm, a universal coupling attaching said arm near one end thereof to said support for lateral and vertical movement of the arm about substantially horizontal and substantially vertical axes of rotation, one of said axes being substantially fixed with respect to said arm and the other substantially fixed with respect to said support, a pair of adjacent relatively movable surfaces with substantially constant clearance therebetween associated with said coupling for relative movement about at least one of said axes of rotation, a stylus mounted on said arm near the end thereof remote from said support with compliance between the stylus and the arm, and a lubricant of high viscosity between said surfaces providing substantial mechanical resistance to movement of said arm in at least one direction, one of said surfaces being substantially immovable in said one direction with respect to the arm and the other surface being substantially immovable in said one direction with respect to said support, the mechanical resistance provided by said viscous lubricant being sufficiently high to substantially damp out low-frequency resonant oscillations of said compliance with the mass of said arm in said one direction.

8. A phonograph reproducer arm assembly comprising a rigid reproducer arm, a support for said arm, a pivotal connection coupling said arm to said support having substantially horizontal and substantially vertical axes of rotation, one of said axes being substantially fixed with respect to said arm and the other substantially fixed with respect to said support, said pivotal connection having relatively movable surfaces with substantially constant clearance therebetween allowing horizontal and vertical movement of said arm, a suspension mounting a stylus on said arm at a point remote from said support, said suspension providing vertical and horizontal compliance between the stylus and the arm, and a lubricant of high viscosity between the relatively movable surfaces of said pivotal connection which allow movement in at least one direction to provide substantial mechanical resistance to movement of said arm in said one direction, one of the last-mentioned surfaces being substantially immovable in said one direction with respect to the arm and the cooperating surface being substantially immovable in said one direction with respect to said support, the mechanical resistance provided by said viscous lubricant being predetermined to substantially damp out low-frequency resonant oscillations of said compliance with the mass of said arm in said one direction.

9. A phonograph reproducer arm assembly for reproducing sound from laterally-modulated sound grooves which comprises a reproducer arm, a support for said arm, a pivotal connection coupling said arm to said support for lateral and vertical movement about substantially horizontal and substantially vertical axes of rotation, one of said axes being substantially fixed with respect to said arm and the other substantially fixed with respect to said support, a suspension mounting a stylus on said arm at a point remote from said support, said suspension providing lateral compliance between the stylus and the arm, and a viscous lubricant in said pivotal connection providing substantial mechanical resistance to movement of said arm in the lateral direction during phonograph reproduction, the mechanical resistance provided by said viscous lubricant being sufficiently high to substantially damp out low-frequency resonant oscillations of said compliance with the mass of said arm in the lateral direction.

10. A phonograph reproducer arm assembly comprising a reproducer arm, a support for said arm, a pivotal connection coupling said arm to said support for lateral and vertical movement about substantially horizontal and substantially vertical axes of rotation, one of said axes being substantially fixed with respect to said arm and the other substantially fixed with respect to said support, a suspension for mounting a stylus on said arm at a point remote from said support, said suspension providing lateral and vertical compliance between the stylus and the arm, and a viscous lubricant in said pivotal connection providing mechanical resistance to movement of said arm in lateral and vertical directions during phonograph reproduction, said mechanical resistance being predetermined to be at least one-third the value required to effect critical damping of the low-frequency resonance of said compliance with the mass of said arm.

11. A phonograph reproducer arm assembly comprising a rigid reproducer arm, a support for said arm, a pivotal connection coupling said arm to said support having substantially horizontal and substantially vertical axes of rotation, one of said axes being substantially fixed with respect to said arm and the other substantially fixed with respect to said support, said pivotal connection having relatively movable surfaces with substantially constant clearance therebetween allowing lateral and vertical movement of said arm, a suspension mounting a stylus on said arm at a point remote from said support, said suspension providing lateral and vertical compliance between the stylus and the arm, and a lubricant of high viscosity between said movable surfaces providing mechanical resistance to movement of said arm in lateral and vertical directions during phonograph reproduction, the magnitude of said mechanical resistance being predetermined to substantially damp out low-frequency resonant oscillations of said compliance with the mass of said arm in said directions.

12. A phonograph reproducer arm assembly comprising a reproducer arm, a support for said arm, a ball-and-socket coupling having a pair of cooperating members with substantially concentric surfaces, one of said members being fixed with said arm and the other fixed with said support, a stylus mounting on said arm at a point remote from said support providing compliance between the stylus and the arm, and a viscous liquid between said concentric surfaces providing substantial mechanical resistance to movement of said arm in lateral and vertical directions, said mechanical resistance effecting substantial damping of the resonance between said compliance and the mass of said arm.

13. A phonograph reproducer arm assembly comprising a substantially rigid reproducer arm, a mounting support for said arm, a ball-and-socket coupling having a pair of cooperating members with substantially spherical concentric surfaces, one of said members being fixed with said arm and the other fixed with said support, a suspension mounting a stylus on said arm at a point remote from said support with lateral and vertical compliance between the stylus and the arm, and a lubricating liquid of high viscocity between said spherical surfaces providing substantial mechanical resistance to movement of said arm, the areas of said spherical surfaces and the clearance therebetween being correlated with said liquid to provide a mechanical resistance at least one-sixth that required to critically damp the low-frequency resonant oscillations of said compliance with the mass of said arm.

14. A phonograph reproducer arm assembly comprising a substantially rigid reproducer arm, a mounting support for said arm, a ball-and-socket coupling joining said arm and said support having a pair of cooperating members with substantially spherical concentric surfaces allowing movement of the arm in lateral and vertical directions, one of said members being fixed with said arm and the other fixed with said support, a pivot associated with said coupling positioned to maintain a predetermined concentric relationship between said members, a suspension mounting a stylus on said arm at a point remote from said support with lateral and vertical compliance between the stylus and the arm, and a lubricating liquid of high velocity between said spherical surfaces providing substantial mechanical resistance to movement of said arm in lateral and vertical directions, said mechanical resistance being sufficiently high to effect substantial damping of the low-frequency resonant oscillations of said compliance with the mass of said arm.

15. A phonograph reproducer arm assembly comprising a substantially rigid reproducer arm, a mounting support for said arm, a ball-and-socket coupling having a pair of cooperating members with substantially spherical concentric surfaces, one of said members being fixed with said arm and the other fixed with said support, a pivot at the center of curvature of said surfaces establishing a predetermined clearance therebetween, a suspension mounting a stylus on said arm at a point remote from said support with lateral and vertical compliance between the stylus and the arm, and a lubricating liquid of high viscosity between said spherical surfaces providing substantial mechanical resistance to movement of said arm, the areas of said spherical surfaces and the clearance therebetween being correlated with said liquid to provide a mechanical resistance at least one-third that required to critically damp the low-frequency resonant oscillations of said compliance with the mass of said arm.

16. A phonograph reproducer arm assembly for reproducing sound from laterally-modulated sound grooves comprising a substantially rigid reproducer arm having a substantially hemispherical convex surface on the under side thereof near one end, a mounting support having a substantially hemispherical concave surface on the upper side thereof cooperating with the convex surface of said arm to form a ball-and-socket joint, a centrally-located vertical pivot pin in said concave surface having a pivot point substantially at the center of curvature thereof, a socket in the convex surface of said arm having a bearing point substantially at the center of curvature thereof engaging said pivot point to maintain a predetermined clearance between the hemispherical surfaces, a suspension mounting a stylus near the end of the arm remote from said support with lateral and vertical compliance between the stylus and the arm, and a lubricating liquid of high viscosity between said hemispherical surfaces providing substantial mechanical resistance to movement of said arm, the areas of said hemispherical surfaces and the clearance therebetween being correlated with said viscous liquid to provide mechanical resistance sufficient to substantially damp out low-frequency resonant oscillations of said compliance with the mass of said arm.

17. A phonograph reproducer arm assembly comprising a substantially rigid reproducer arm, a mounting support for said arm, a ball-and-socket coupling joining said arm and said support having a pair of cooperating members with substantially spherical concentric surfaces allowing movement of the arm in lateral and vertical directions, one of said members being fixed with said arm and the other fixed with said support, a pivot at the center of curvature of said surfaces establishing a predetermined clearance therebetween, a suspension mounting a stylus on said arm at a point remote from said support with lateral and vertical compliance between the stylus and the arm, and a lubricating liquid of high viscosity between said spherical surfaces providing substantial mechanical resistance to movement of said arm in lateral and vertical directions, said mechanical resistance effecting substantial damping of the resonance between said compliance and the mass of said arm.

18. A phonograph reproducer arm assembly comprising an arm, a support for said arm, a coupling movably attaching said arm to said support for movement in both horizontal and vertical directions, said coupling having a pair of adjacent surfaces relatively movable throughout the entire range of movement of the arm in either of said directions and means for maintaining a constant clearance between said surfaces, a stylus mounting on said arm at a point remote from said support providing compliance between the stylus and the arm, and a viscous material between said surfaces providing continuous mechanical resistance to movement of said arm in at least one of said directions during phonograph reproduction, said resistance being selected to substantially damp the resonance of said compliance with the mass of said arm.

19. A phonograph reproducer arm assembly as defined in claim 18 in which the viscous material provides continuous mechanical resistance to movement of the arm in each of said directions during the playing of a phonograph record.

References Cited in the file of this patent

UNITED STATES PATENTS

| Number | Name | Date |
|---|---|---|
| 1,133,685 | Weber | Mar. 30, 1915 |
| 1,240,267 | Taxon | Sept. 18, 1917 |
| 1,721,362 | Weir | July 16, 1929 |
| 1,792,497 | Keller et al. | Feb. 17, 1931 |
| 1,844,623 | Yeider | Feb. 9, 1932 |
| 1,996,511 | Harrison | Apr. 2, 1935 |
| 2,236,599 | Hutter | Apr. 1, 1941 |
| 2,445,762 | Chanal | July 27, 1948 |
| 2,551,506 | Rockwell | May 1, 1951 |

FOREIGN PATENTS

| Number | Country | Date |
|---|---|---|
| 759,373 | France | Feb. 2, 1934 |
| 649,960 | Germany | Sept. 11, 1937 |
| 112,425 | Australia | Jan. 29, 1941 |